Nov. 2, 1965    H. C. RYAN    3,215,979

MOTOR VEHICLE SIGNAL LIGHT SYSTEM

Filed Feb. 6, 1961    2 Sheets-Sheet 1

Inventor
HARRY CLINTON RYAN by: *J. Harold Kirches*
Attorney

Nov. 2, 1965  H. C. RYAN  3,215,979

MOTOR VEHICLE SIGNAL LIGHT SYSTEM

Filed Feb. 6, 1961  2 Sheets-Sheet 2

Inventor
HARRY CLINTON RYAN by: *[signature]*

Attorney 3,215,979
MOTOR VEHICLE SIGNAL LIGHT SYSTEM
Harry Clinton Ryan, 2537 Yonge St., Apt. 1,
Toronto, Ontario, Canada
Filed Feb. 6, 1961, Ser. No. 87,420
2 Claims. (Cl. 340—66)

This invention relates to an improved motor vehicle signal light system. It is particularly directed to a signal light system which will warn following vehicles of a reduction of vehicle speed.

One of the disadvantages of conventional signal light systems presently employed on motor vehicles to warn following vehicles of speed reductions is the lack of means to signal speed reductions after the accelerator is released but before the brake pedal is depressed. When travelling at high speeds on crowded highways, it is imperative that maximum warning be given of reductions in speed. For example, after the accelerator is released, considerable slowing of the vehicle's forward speed may take place before the brakes are applied and the driver of a following car may be warned too late to permit the driver to take precautionary measures to avoid a collision. This hazard, which is especially augmented under adverse driving conditions, presents a serious problem at all times even under favourable driving conditions.

It is a general object of the present invention to provide an improved signal light system which will advise and warn drivers of following vehicles of the state of operation of a motor vehicle.

It is another object of the present invention to provide an improved signal light system which will immediately advise and warn drivers of following vehicles of speed reductions prior to the application of brakes.

These and other objects of the present invention will become apparent from the following detailed description, reference being made to the accompanying drawings in which.

Like reference characters refer to like parts throughout the body of the specification and drawing.

Figure 1:
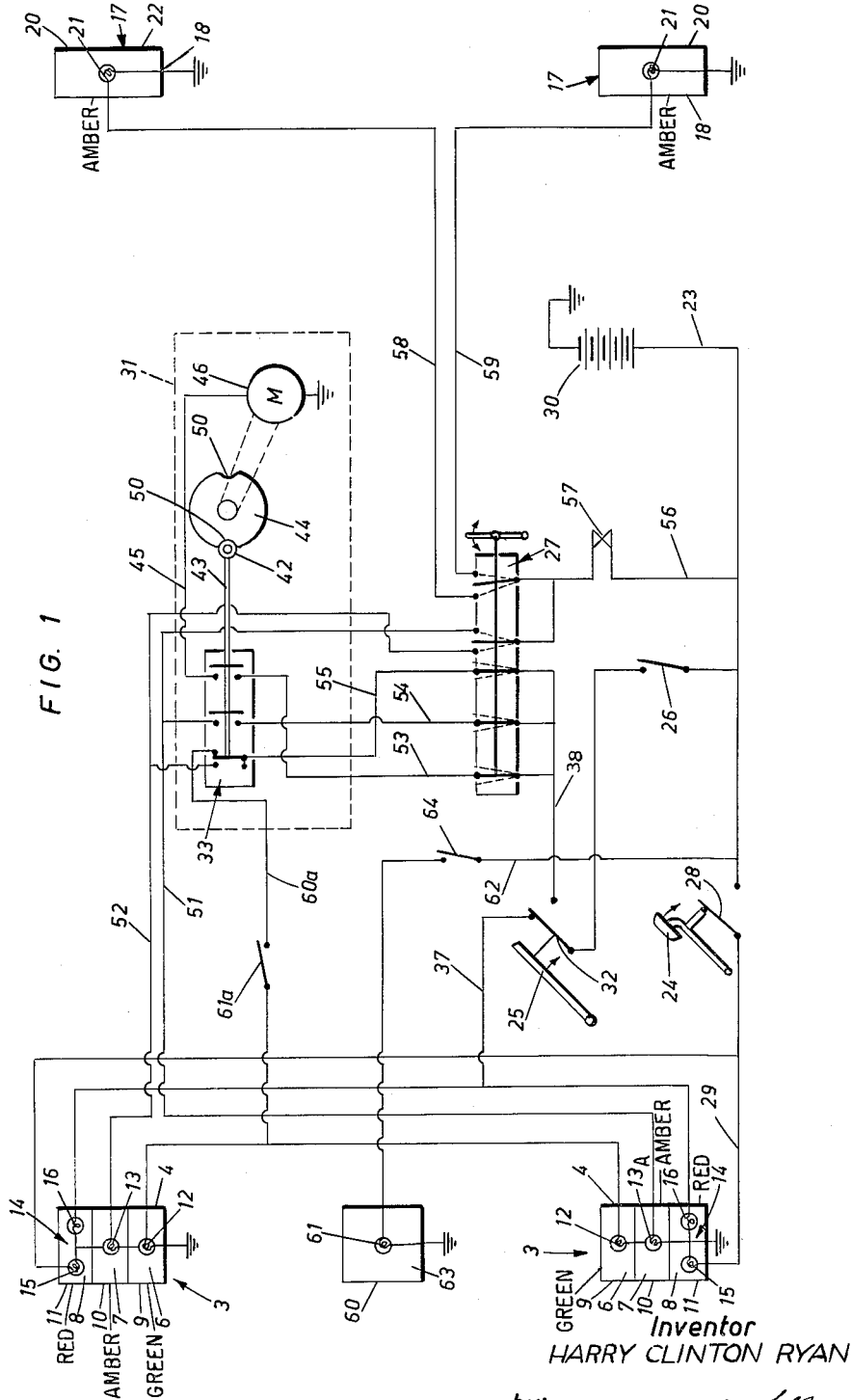
FIGURE 1 is a schematic diagram of a preferred embodiment of the electrical circuit.

With particular reference to FIGURE 1, conventional motor vehicles have dual signal light enclosures 3 mounted at the rear of said vehicles at convenient positions on both sides such that the drivers of following vehicles can readily discern warning signals. The enclosures normally comprise metal bodies 4 rigidly secured to the vehicle body in recesses formed in the vehicle fenders such that at least one face of each enclosure is exposed to and visible from the rear.

In the present invention, each of said enclosures is divided into three compartments as designated by numerals 6, 7 and 8, and the externally exposed face of each of said compartments is covered by a separate transparent or translucent material such as glass or plastic of different colour. For example, compartment 6 has a glass cover plate 9 preferably green in colour, compartment 7 has a glass cover plate 10 preferably amber in colour, and compartment 8 has a glass cover plate 11 preferably red in colour.

Incandescent bulbs having filaments 12 and 13 respectively are positioned in compartments 6 and 7 and a double filament incandescent bulb, indicated generally by the numeral 14, is positioned in compartment 8. The two filaments in bulb 14 differ in intensity, with filament 15 preferably being of greater intensity than filament 16.

At the front of the motor vehicle, as is conventional practice, signal light enclosures 17 are also positioned such that the drivers of oncoming vehicles can readily discern the signals emitted therefrom. The enclosures comprise single compartment metal enclosures 18 normally rigidly secured to the vehicle body in recesses formed in the vehicle fenders such that at least one face of each compartment 20 is exposed and visible from the front. Incandescent bulbs each having single filaments 21 are positioned therein and glass plate covers 22, preferably amber in colour, are attached to the externally exposed face thereof.

Each of the filaments in the rear compartments 6, 7 and 8, and in the front compartments 20, are grounded to complete the electrical circuit.

The signal light filaments are independently energized by the electrical circuit 23 which, in turn, is activated in part by switching elements controlled by the vehicle operating mechanisms such as the brake pedal 24 and accelerator 25 and by manually operated switches such as the ignition switch 26 and direction signal switch 27.

Brake light switch 28 is actuated by the brake pedal 24 to open and close circuit 29 from power source 30 to filament 15. This circuit is independent of the ignition system and thus by-passes ignition switch 26 as is standard practice in the present art.

Figure 2:
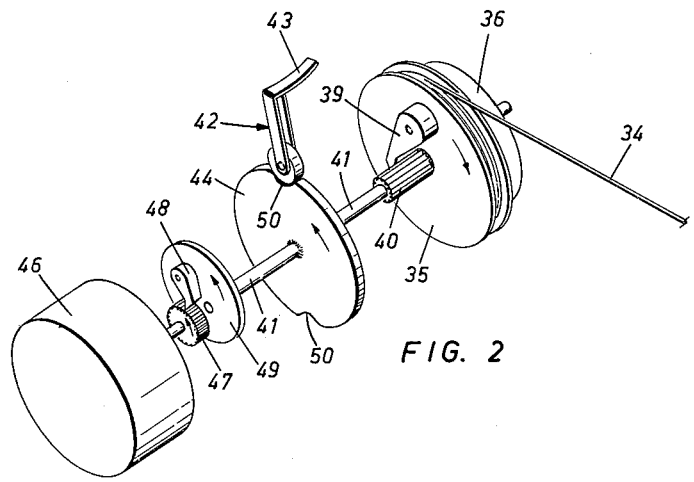
FIGURE 2 is a schematic view of a control and timing mechanism used to actuate the signal devices.

To accelerator pedal 25 or to linkage means connecting the accelerator to the fuel regulating system, a control and timing device 31 is connected to actuate switch 32 and switch 33. The combination of parts which comprise the timing and control device as illustrated in FIGURE 2 is merely one embodiment of means useful in operating the electrical circuit but will described herein to give a clear understanding of the electrical circuit which will be described in detail hereinafter.

A flexible cord or wire 34 is secured to accelerator pedal 25 or linkage connected thereto such that as the pedal is depressed, cord 34 is extended and thereby rotates pulley 35 in the direction shown. Pulley 35 is normally urged in the opposite direction by coil spring 36, and when the accelerator is in its normally raised position, retracts cord 34 which activites a single-pole, double-throw switch 32 to close circuit 37. Switch 32 is adapted to open circuit 37 and close circuit 38 by a minor depression of the accelerator pedal.

As the accelerator is being depressed, ratchet 39 slips over notches 40 on shaft 41. Upon a minor release of pressure on the accelerator, pulley 35 is urged in the opposite direction to that shown and ratchet 39 engages notches 40, thereby rotating shaft 41. Arm 42, urged downward by a leaf spring 43, is raised by the peripheral contour of wheel 44 as said wheel is rotated by shaft 41. The upward movement of arm 42, as shown schematically by FIGURE 1, closes circuit 45 to motor 46 thereby energizing said motor. Motor 46, in turning, rotates sprocket wheel 47 which is engaged by ratchet 48 which is pivotally attached to a disc 49. Disc 49 is rigidly secured to shaft 41 which is in axial alignment with the output shaft of motor 46 and thus rotates the shaft and wheel 44 in the direction shown when ratchet 48 engages sprocket wheel 47. Wheel 44 is rotated until arm 42 drops into notch 50 formed in the periphery of said wheel and opens circuit 45 to de-energize motor 46.

Arm 42 in its uplifted position also closes circuits 51 and 52 to the two rear amber signal compartments 7 and energizes filaments 13 therein. Thus, while wheel 44 is being rotated by motor 46, the two rear amber lights are energized, the duration of energization being predetermined by the rate of rotation and diameter of wheel 44 and by the spacing of notches 50 in the wheel periphery.

Direction signal switch 27 is adapted in its neutral position, as shown, to permit energization of circuits 45, 51 and 52 by way of conductors 53, 54 and 55 when switch 32 is in its downward position and switch 33 is in its upward position. Upward movement of direction signal switch 27, said movement corresponding in operation to signalling a left turn, opens circuits fed by conductor 38 and brings conductor 56 with flasher 57 in contact with circuits 58 and 52 and intermittently energizes filaments 13 and 21 in the amber compartments on the left side of the motor vehicle. Similarly, a downward movement of switch 27 from its neutral point also opens the circuits fed by conductor 38 and intermittently energizes circuits 59 and 51 to illuminate front and rear amber compartments on the right side of the motor vehicle.

A compartment 60, rigidly secured to the rear of the motor vehicle body in a position readily visible by drivers of following vehicles, contains a bulb having a single filament 61 therein, connected to the power supply by conductor 62. The rearward facing side of said compartment 60 is preferably covered with a colourless translucent plate 63. Conductor 62 is preferably connected in parallel to the headlight circuit, not shown, and is opened or closed by switch 64.

In normal operation, the ignition switch 26 is closed to energize electrical circuit 23 and the accelerator pedal 25 is depressed to control the vehicle's speed. Depression of pedal 25 causes cord 34 to extend and rotate pulley 35 which turns freely on shaft 41. As has been hereinbefore described, a slight depression of accelerator pedal 25 activiates switch 32 to close the circuits supplied by conductor 38. Switch 33 is in its downward position and thus circuit 60a to rear compartments 6, covered by green translucent glass plates 9, is energized by way of conductor 55 and the green signal lights are illuminated. As it may be preferred not to employ the green signal lights during the day, switch 61a can be used to open circuit 60a.

A slight release of pedal 25 permits pulley 35 to be urged by spring 36 in a direction opposite to its original direction of rotation. Ratchet 39 engages notches 40 of the shaft, turning said shaft and wheel 44 theretogether and thereby forcing arm 42 to be uplifted breaking circuit 60a to rear compartments 6 which are covered by green translucent glass plates, and closing circuit 45 to motor 46 and circuits 51 and 52 to the rear compartments 7 which are covered by amber translucent glass plates.

The amber signal lights are energized for a predetermined period of time as has been hereinbefore described. In one embodiment of my invention, the rear amber signal lights are energized about three seconds. For example, if the motor vehicle speed is reduced from 60 to 55 miles per hour, the green signal lights de-energized and the amber signal lights are illuminated for the three second period. At the end of this period, the amber signal lights are de-energized and the green signal lights illuminated if speed is not further reduced.

When the direction signal switch is engaged, the right or left pair of amber lights are energized and the circuits to the green and amber lights are opened. If speed is reduced to almost a stop and the accelerator pedal 25 is in its normally upward position, switch 32 opens the circuit 38 to the green and amber lights and closes circuit 37 to filaments 16 in rear compartments 8 covered by red translucent glass plates, thus presenting red and flashing amber warning lights to following vehicles and a flashing amber light to oncoming vehicles.

Circuit 56 controlled by the direction signal switch 27 and circuit 29 controlled by brake pedal 24 function independently of the ignition switch 26.

Figure 3:
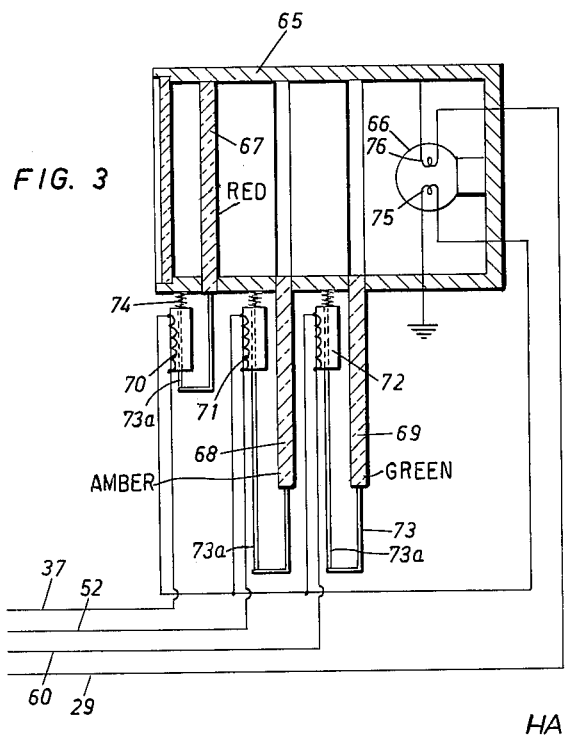
FIGURE 3 is a schematic view of a solenoid-controlled signal-light mechanism.

It may be preferred to employ solenoid controlled, coloured translucent shutters in place of the plurality of incandescent bulbs as has been described. This may be readily accomplished by substituting the three-compartment enclosure by a single compartment enclosure 65 which contains a two filament incandescent bulb 66 therein as illustrated by FIGURE 3 and described herebelow.

Red, amber and green translucent shutters, designated by numerals 67, 68 and 69, are slidably mounted in a spaced relation to enclosure 65, such that said shutters can slide into and out of said enclosure. Solenoids 70, 71 and 72, connected to shutters 67, 68 and 69 by linkages 73 and 73a, are energized in the same manner as the filaments are energized by the electrical circuit illustrated in FIGURE 1.

In operation, the shutters are held out of the enclosure by compression springs 74 while the solenoids are de-energized. Energization of a solenoid, as illustrated by solenoid 70, draws the connected shutters into the enclosure as illustrated by shutter 67. Filament 75 of incandescent bulb 66 is connected in series with the solenoids and is thus energized while the shutters are engaged.

Filament 76 of bulb 66, preferably of greater intensity than filament 75, is connected by conductor 29 to switch 28 which is activated by brake pedal 24. When brake pedal 24 is depressed, the accelerator 25 is normally in its raised position closing circuit 37 and energizing solenoid 70. Thus, when the brake light is illuminated, red shutter 67 is held within the enclosure and a red signal light is emitted.

It will be understood, of course, that modifications can be made in the preferred embodiment of the invention described and illustrated herein without departing from the scope of the invention as defined by the appended claims.

What I claim and desire to protect by Letters Patent of the United States is:

1. In a signal light system for motor vehicles having electrically energizable illuminating means for emitting a warning light upon reduction of the forward speed of the vehicle, the improvement which comprises, in combination, a voltage source, a ground, an accelerator, a normally open switch, a circuit between said voltage source and ground having said illuminating means and normally open switch in series, means actuable by the release of said accelerator for closing said switch for a predetermined period of time comprising a shaft, motor means coupled to said shaft for rotating said shaft in one direction, means for disengaging said shaft from the motor means permitting rotation of said shaft in the opposite direction, a pulley rotatably mounted on said shaft having means permitting the rotation of said pulley on said shaft in a direction opposite to the direction of rotation of said motor means, a cord wrapped about said pulley secured at one end to said pulley and at the opposite end to the accelerator, means secured to the pulley adapted to tension said cord by rotating the pulley and shaft upon release of the accelerator, a wheel rigidly mounted on said shaft, normally open switch means, a second circuit between said voltage source and ground having said normally open switch means and motor means in series, and means operable by rotation of said wheel for closing said first and second circuit switch and switch means for a predetermined period of time.

2. In a signal light system for motor vehicles as claimed in claim 1 wherein said illuminating means comprise an enclosure containing a plurality of solenoid controlled, slidably mounted red, green and amber coloured translucent shutters and electrical circuits independently energizing each of said solenoids, said electrical circuits actuated by the vehicle accelerating, braking and direction signalling means, said first circuit switch in series with the voltage source, ground and the solenoid for said amber shutter.

References Cited by the Examiner

UNITED STATES PATENTS

| 1,493,050 | 5/24 | Newell | 340—382 |
| 2,014,286 | 9/35 | Nelson | 340—63 |
| 2,269,070 | 1/42 | White | 340—62 |
| 2,760,113 | 4/56 | Danek | 340—71 |
| 2,833,880 | 5/58 | Repkow | 340—71 |
| 2,992,418 | 7/61 | McNiel | 340—71 |

NEIL C. READ, *Primary Examiner.*

BENNETT G. MILLER, *Examiner.*